(12) United States Patent
Hyun

(10) Patent No.: US 9,603,348 B2
(45) Date of Patent: Mar. 28, 2017

(54) FISHING REEL EQUIPPED WITH MARKER FOR LINE TYPE

(71) Applicant: DOYO ENGINEERING CO., LTD., Bucheon (KR)

(72) Inventor: Kang Ho Hyun, Bucheon (KR)

(73) Assignee: DOYO ENGINEERINGS CO., LTD., Bucheon (KR)

( * ) Notice: Subject to any disclaimer, the term of this patent is extended or adjusted under 35 U.S.C. 154(b) by 0 days.

(21) Appl. No.: 14/969,243

(22) Filed: Dec. 15, 2015

(65) Prior Publication Data

US 2016/0165867 A1 Jun. 16, 2016

(30) Foreign Application Priority Data

Dec. 15, 2014 (KR) .................. 10-2014-0179992
Sep. 14, 2015 (KR) .................. 10-2015-0129843

(51) Int. Cl.
*A01K 89/01* (2006.01)

(52) U.S. Cl.
CPC ...... *A01K 89/0192* (2015.05); *A01K 89/0183* (2015.05); *A01K 89/01121* (2015.05)

(58) Field of Classification Search
CPC .. A01K 89/006; A01K 89/01; A01K 89/0102; A01K 89/0111; A01K 89/01121; A01K 89/015; A01K 89/0162; A01K 89/0192; G09F 9/00; G01L 5/047
See application file for complete search history.

(56) References Cited

U.S. PATENT DOCUMENTS

| | | | | |
|---|---|---|---|---|
| 2,209,598 A * | 7/1940 | Coxe | .................. | A01K 89/015 242/260 |
| 3,855,960 A * | 12/1974 | Caldwell | .................. | G09F 9/00 116/282 |
| 3,888,011 A * | 6/1975 | Hunt, Jr. | .................. | G01B 3/00 242/223 |
| 3,903,837 A * | 9/1975 | Barton | .................. | G09F 9/00 116/315 |
| 4,203,565 A * | 5/1980 | Puryear | .................. | A01K 89/01 116/307 |
| 4,501,370 A * | 2/1985 | Kelley | .................. | A61J 7/04 116/308 |
| 4,762,290 A * | 8/1988 | Emura | .................. | A01K 89/00 24/127 |
| 5,370,329 A * | 12/1994 | Kono | .................. | A01K 89/027 116/309 |
| 5,568,787 A * | 10/1996 | Forslund | .................. | A01K 89/00 116/307 |
| 5,924,639 A * | 7/1999 | Atherton | .................. | A01K 89/0111 116/309 |

(Continued)

FOREIGN PATENT DOCUMENTS

KR 200133434 12/1998

*Primary Examiner* — Emmanuel M Marcelo
(74) *Attorney, Agent, or Firm* — Cantor Colburn LLP

(57) ABSTRACT

A fishing reel having a line type marker. The fishing reel includes a frame, a spool fitted on the frame, and a handle fitted on a side of the frame to turn the spool, and further includes a line type marker including: a rotary member coupled to a mounting portion, which is provided at some or all of the frame, the spool, and the handle; a scale indication section on the rotary member; and a scale section around the rotary member.

4 Claims, 31 Drawing Sheets

(56) References Cited

U.S. PATENT DOCUMENTS

| | | | | |
|---|---|---|---|---|
| 6,564,495 B1* | 5/2003 | Fehlig | ............. | A01K 97/00 |
| | | | | 43/4 |
| 8,695,269 B1* | 4/2014 | Gray | ............. | A01K 87/007 |
| | | | | 43/18.1 R |
| 2012/0103849 A1* | 5/2012 | Rachuk | ............. | A61M 1/0001 |
| | | | | 206/459.1 |

* cited by examiner

FISHING REEL EQUIPPED WITH MARKER FOR LINE TYPE

BACKGROUND OF THE INVENTION

Field of the Invention

The present invention relates to a fishing reel having a line type marker.

In particular, the present invention relates to a fishing reel having a marker, which shows a line type such as the thickness or the kind of a fishing line (monofilament such as nylon, a braid, and polyethylene braid), not on apportion such as a palm side of a frame where the mark may be removed due to contact, but on a frame, a spool, or a portion of a handle, including a handle knob, where the marker can be protected by being shielded against a user or other objects because it is covered with a handle.

Description of the Related Art

In general, fishing lines are indicated by number (KR) or lb (US), depending on the thickness, and are made of various materials such as monofilament such as nylon, a braid, and polyethylene braid having strength three times that of the monofilament.

Users separate a fishing rod and a reel to clean or keep fishing equipment after fishing in consideration of line types relating to the thickness and material.

When users combine a fishing rod and a reel for later use, it is difficult to check the line type of the fishing line wound on the reel, and it is troublesome to use a device for checking the line type. In fact, most users don't even have such a device.

In order to solve this problem, users write the line type with a pen or put a sticker on the reel, but the note or sticker may be damaged or removed due to various reasons.

In order to solve this problem, there is Korean Utility Model No. 20-0133434 (registered on Oct. 12, 1998, titled "Device for indicating size of the fishing line in the spinning reel").

This document proposes a device for indicating the size of a fishing line in a spinning reel, in which a spool has a winder on which a fishing line is wound, a plate is rotatably coupled to a side of the spool, and a spool cover has numbers indicating the size of a fishing line on the front of the plate, so as the plate is rotated, the sizes of the fishing line of the spinning reel wound on the spool are indicated. The device includes a stopper formed axially with respect to the spool around a hole of the plate mounting portioned in a groove of the spool; a plurality of grooves formed around the inner side of the spool cover coupled to a coupling portion formed at the end of the spool, in the same direction as the stopper formed on the plate; and an oblong hole formed at a predetermined portion of the groove of the plate.

However, this device has a problem in that the sizes are marked on a spool cover that a user can easily touch in use such as during fishing, and the marked states of the line numbers can be changed due to various reasons.

Further, a "Line Type Indicator for Fishing Reel" has been disclosed in U.S. Pat. No. 5,568,787 (registered on Oct. 29, 1996).

This document proposes a technique of setting a line type in a radial type on a handle nut cap.

However, the indicator protrudes on a handle arm, so it interferes with fishing, and when the dial is turned for setting a line type to memory, the handle is also turned, so setting is uncomfortable.

Further, since the handle nut cap is fixed by a screw, when the line type indication standard (for example, fishing line number and lb, monofilament and braid) is changed, it cannot be used. Furthermore, the dial has to be replaced every time the line type indication standard is changed.

Further, a "Line-Type Indicator for Spool on a Fishing Reel" has been disclosed in U.S. Pat. No. 5,924,639 (registered on Jul. 20, 1999).

This device also has a problem similar to Korean Utility Model No. 20-0133434, that is, setting may be changed by mistake of a user in fishing and the change may cause an error. Further, it does not propose a plan for changing a line type indication standard.

SUMMARY OF THE INVENTION

Accordingly, the present invention has been made keeping in mind the above problems occurring in the related art, and the present invention is intended to propose a fishing reel, in which a mounting portion is provided not at a portion, where it can be changed or damaged by touch by a user or an object such as a palm side of a frame, but at specific parts of a frame, a spool, or a handle such as a handle knob, a handle nut cap, a star drag nut, a palm side cover of a frame, a spool, or a tension nut so that a marker setting state can be protected and maintained by preventing touch by a user or an object, and in which markers showing line types such as the kinds (monofilament such as nylon or a braid) or thickness of a fishing line are provided at the mounting portion.

Further, the present invention provides a fishing reel having a line type marker in which an error in setting is prevented due to touch during fishing because it does not protrude, that does not easily change in setting when a user sets a line type by turning a rotary member, and that allows a rotary member to be easily replaced in order to change the line type standard (fishing line number and lb, or monofilament and braid).

Further, the present invention provides a fishing reel having a line type marker that prevents unexpected turning of a rotary member and includes a clicking member that makes a user focus on setting with a sound when the rotary member is turned for line type marking.

In order to achieve the above object, according to one aspect of the present invention, there is provided a fishing reel that includes a frame, a spool fitted on the frame, and a handle fitted on a side of the frame to turn the spool, and further includes a line type marker including: a rotary member coupled to a mounting portion provided at some or all of the frame, the spool, and the handle; a scale indication section on the rotary member; and a scale section around the rotary member, in which one of the sections includes indicators and the other one includes scales, the indicators are a plurality of marks spaced from each other to indicate different lines, the scales are a plurality of numbers spaced from each other, and only one of the indicators indicates one number and the other indicators do not indicate numbers in line type marking; the line type marker includes a stopper fixing the rotary member to the mounting portion; the mounting portion has a step inside an edge, wherein an inner diameter of the step is larger than an outer diameter of the rotary member, thereby forming a gap, and an elastic ring that functions as the stopper is fitted between a portion under the step of the mounting portion and a ring-shaped groove of the rotary member.

A releasing groove may be formed by cutting off a portion of the step. Further, a shaft hole may be formed through the rotary member, and a projection that is fitted in the shaft hole may be formed inside the mounting portion.

The rotary member may further have a clicking member.

According to the fishing reel having a line type marker of the present invention, a mounting portion is provided not at a portion, where it can be changed or damaged by touch by a user or an object such as a palm side of a frame, but at specific parts of a frame, a spool, or a handle such as a handle knob, a handle nut cap, a star drag nut, a palm side cover of a frame, a spool, or a tension nut so that a marker setting state can be protected and maintained by preventing touch by a user or an object; and markers showing line types such as the kinds (monofilament such as nylon or a braid) or thickness of a fishing line are provided at the mounting portion; therefore, the marker setting state can be protected and maintained by preventing touch by a user or an object. Further, an error in setting is prevented due to touch during fishing because it does not protrude, that does not easily change in setting when a user sets a line type by turning a rotary member, and that allows a rotary member to be easily replaced in order to change the line type standard (for example, fishing line number and lb, or monofilament and braid). Further, since the fishing reel further includes a clicking member, it is possible to prevent unexpected turning of a rotary member and to make a user focus on setting with a sound when the rotary member is turned for line type marking.

BRIEF DESCRIPTION OF THE DRAWINGS

The above and other objects, features and other advantages of the present invention will be more clearly understood from the following detailed description when taken in conjunction with the accompanying drawings, in which:

FIGS. 2 to 6B-3 are views showing a handle (particularly, handle knob) having a line type marker according to the present invention (FIG. 2), a spool (particularly, a star drag nut) (FIG. 3), a frame (particularly, a palm side cover) (FIG. 4), a spool (particularly, a spare spool) (FIG. 5), and a spool (particularly, a tension nut) (FIGS. 6A-1 to 6B-3);

DETAILED DESCRIPTION OF THE INVENTION

Figure 1A:
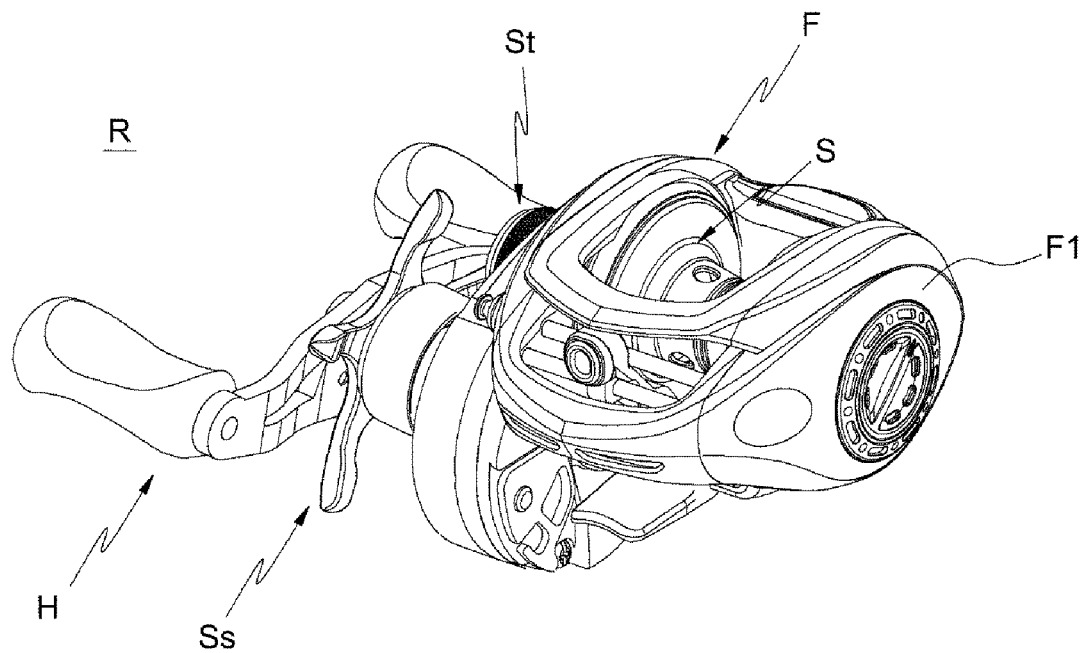
FIGS. 1A and 1B are views showing a common fishing reel by the applicant(s)

The present invention is described hereafter in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within the ideas and technical scope of the present invention. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration; nevertheless, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

In the following description, when it is determined that well-known function and configuration may unnecessarily make the spirit of the present invention unclear, they will not be described.

Not accurate, but approximate directions are determined for the convenience of describing a fishing reel R having a line type marker according to the present invention with reference to FIGS. 2 to 16E, in which up-down and left-right directions are as those shown in the figures and these directions are applied in the same way unless specifically stated in the following description and claims.

Figure 1B:
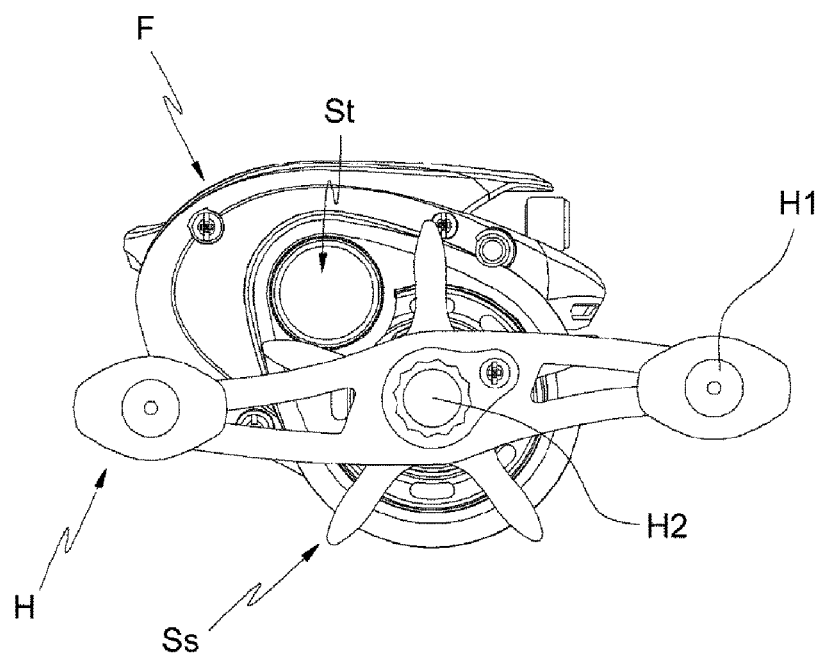

As shown in FIGS. 1A and 1B, which are a perspective view and a front view, respectively, of a bait reel by the applicant(s), a fishing reel R includes a frame F, a spool S fitted on the frame, and a handle H fitted on the frame to rotate the spool, in which a line type marker M of the present invention is applied to mounting portions on some or all of the frame, spool, and handle.

In detail, as shown in FIGS. 1A to 6B-3 in relation to a bait reel (bait casting reel), mounting portions may be provided on a handle knob H1 and a handle nut cap H2 of the handle H, a star drag nut Ss for adjusting drag power to protect a fishing line by reducing the unrolling speed of the fishing line from the spool S by a fish moving away with a hook, the spool itself, a tension nut St disposed at a side of the frame to adjust a casting distance by adjusting the rotational speed of a spool shaft, and a palm side cover F1 of the frame F (mounting portions are provided on the handle (particularly, the handle knob (FIG. 2)), the spool (particularly, the star drag nut (FIG. 3)), the frame (particularly, the palm side cove (FIG. 4)), the spool (particularly, spare spools (FIG. 5)), the spool (particularly, the tension nut (FIGS. 6A-1 to 6B-3))).

As shown in FIGS. 7A to 10B, in a spinning reel that is weaker than a bait reel, but is suitable for casting a lure and can accurately cast a light lure to a desired point, mounting portions are provided on a handle (particularly, a handle nut cap (FIGS. 7A, 7B and 8A), a handle knob (FIG. 8B), a handle arm decoration cover (FIG. 9A), a handle arm fixing bolt cover (FIG. 9B)), a spool (FIG. 10A), and a frame (particularly, and a bail wire fixing bolt (FIG. 10B)).

The mounting portions for a line type marker M showing the numbers (thickness) and kinds of fishing lines may be formed to be suitable for the frame of a fishing reel, and a ring-shaped portion where a rotary member of a line type marker can be disposed on a spool or a handle.

A line type marker M generally includes a rotary member 'r' on a mounting portion, a stopper for fixing the rotary member to the mounting portion, a scale indication section on the rotary member, and a scale section around the rotary member, in which one of the sections may include indicators and the other one may include scales.

Figure 2:
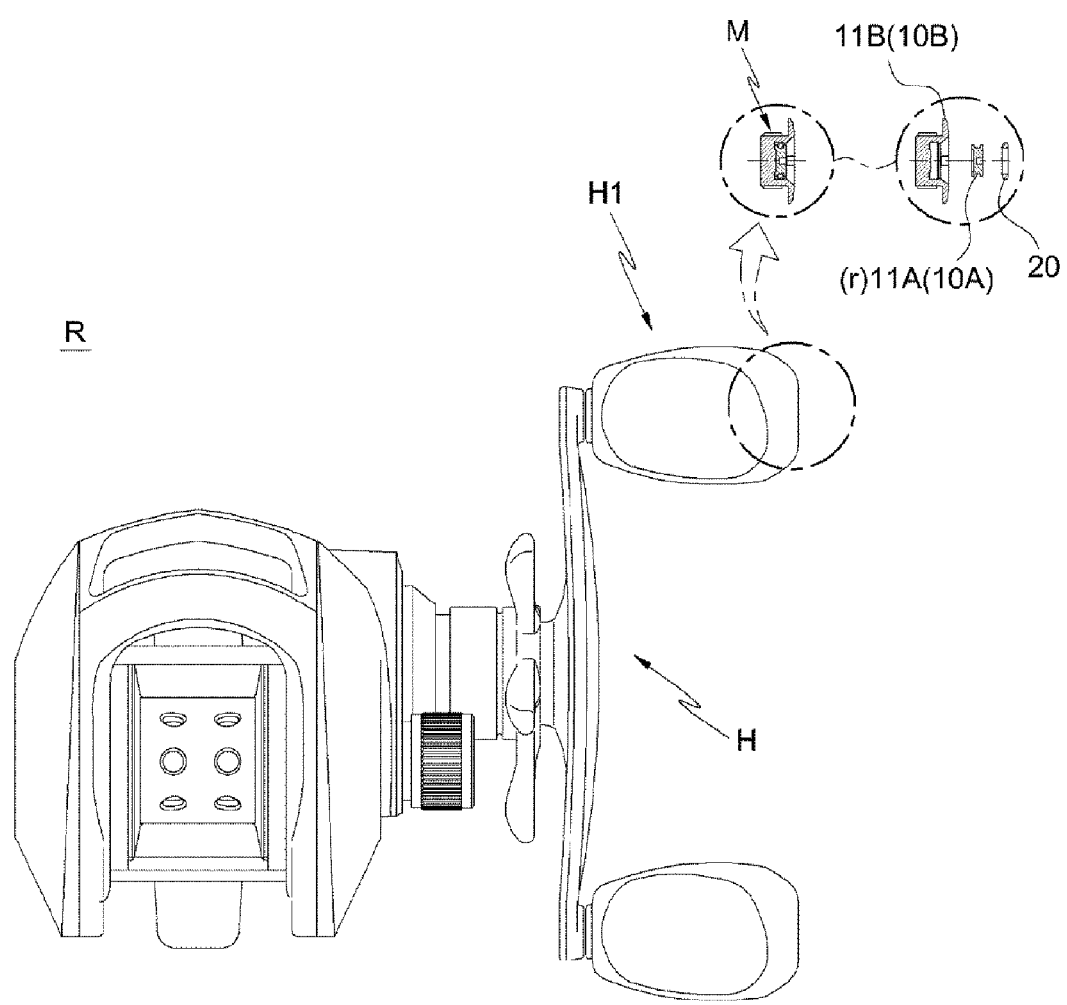
Figures 1, 6A:
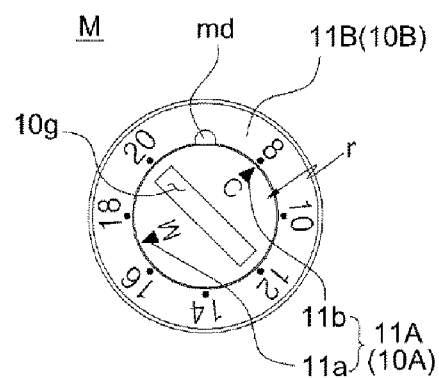
FIGS. 11A-1 to 16E are views showing main parts with various line type markers.
Figures 2, 6A:
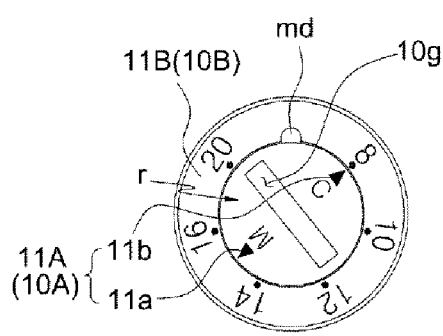

In relation to a line type maker and a mounting portion, FIGS. 6A-1 and 6A-2 show only a tension nut with a marker M seen from the front, as in FIG. 1B, and FIGS. 6B-1 to 6B-2 and FIGS. 11A-1 and 12B-2 show a rotary member, a stopper, and an assembly of a rotary member, a stopper, and a tension nut of a line type marker M at upper, middle, and lower portions.

As can be seen from FIGS. 6A-1, 6A-2, and 6B-1, a line type scale section 10B is provided around the edge of a tension nut St. The scale section 10B, that is, a scale 11B is shown by 8, 10, 12, 14, 16, 18, and 20 by lb, which correspond to line numbers 1, 2, 2.5, 3, 4, and 5, respectively.

If necessary, line numbers may be shown in Arabic numerals (or Roman numerals) instead showing the thickness of fishing lines by lb on the scale, or both may be shown, and other various symbols other than Arabic numerals and Roman numerals may be used, including any types of existing or new symbols.

A rotary member 'r' having a scale indication section 10A is coupled to a mounting portion inside the scale 11B, particularly, a ring-shaped mounting portion of the tension nut St.

The scale indication section on the rotary member 'r' includes indicators 11A for indicating numbers such as an arrow (M (11a) for indicating the thickness of a fishing line made of monofilament and C (11b) for indicating the thickness of a fishing line made of a braid) (PE indicates a polyethylene braid, which is three-time stronger than nylon monofilament).

If necessary, the scale indication section of the rotary member may be a scale (for the line thickness) instead of the scale on the tension nut St and indicators for indicating numbers such as an arrow may be provided on the tension nut.

In any case, the scale indication section (for example, arrows) and the scale section (for example, scales) may be made by printing, transcribing, plating, intaglio, engraving, or attaching a sticker.

As described above, since the line type marker M for a fishing reel R according to the present invention has both of the mark M (arrow 11a) for showing the thickness of line made of monofilament and the mark C (arrow 11b) for showing the thickness of a line made of braid on one rotary member, even if it is required to change the line type indication standard (line number, lb, monofilament, braid, and PE braid), it is possible to show all the types (M, C, PE), and if necessary, the rotary member can be replaced.

The arrangement and structure can be selected to prevent a change of setting of the line type marker due to various reasons in fishing, carrying, and keeping. Further, for example, when a line type maker is provided on a tension nut and is set by turning a rotary member, torque of the tension nut is relatively strong, so the rotary member is not rotated with the tension nut.

In order to easily mount and replace the rotary member 'r' of the line type marker M, as shown in FIGS. 6A-1, 6A-2, 6B-1, and 6B-2, the ring-shaped mounting portion 'm' formed on the tension nut St has a step 'ms' inside the edge (see FIG. 6B-2), the inner diameter of the step is larger than the outer diameter of the rotary member, so a gap is formed between the step and the rotary member, and an elastic ring that functions as a stopper 20 is fitted between a portion under the step 'ms' of the mounting portion and a ring-shaped groove 13 of the rotary member 'r' to prevent unexpected separation of the rotary member 'r' and unexpected rotation due to various shocks or friction after setting for line type marking.

As can be seen from FIGS. 6A-1, 6A-2, and 6B-3, a releasing groove 'md' is formed by cutting off a portion inside the scale indication section 10B of the tension nut St, that is, a portion of the step 'ms', so it is possible to easily separate the rotary member 'r' by putting a tool into the releasing groove 'md' and pressing the elastic ring stopper 20 fitted between the step 'ms' of the mounting portion 'm' and the ring-shaped groove 13 of the rotary member 'r'.

In FIGS. 6B-1, 6B-2, and 6B-3, a cross-sectional view of the rotary member 'r', a plan view of the stopper 20, and a cross-sectional view of the assembly of the rotary member, stopper, and tension nut are shown at the upper, middle, and lower portions, and this type of arrangement is the same in FIGS. 11B-1 to 11B-3 and 12B-1 to 12B-3.

Figure 3:
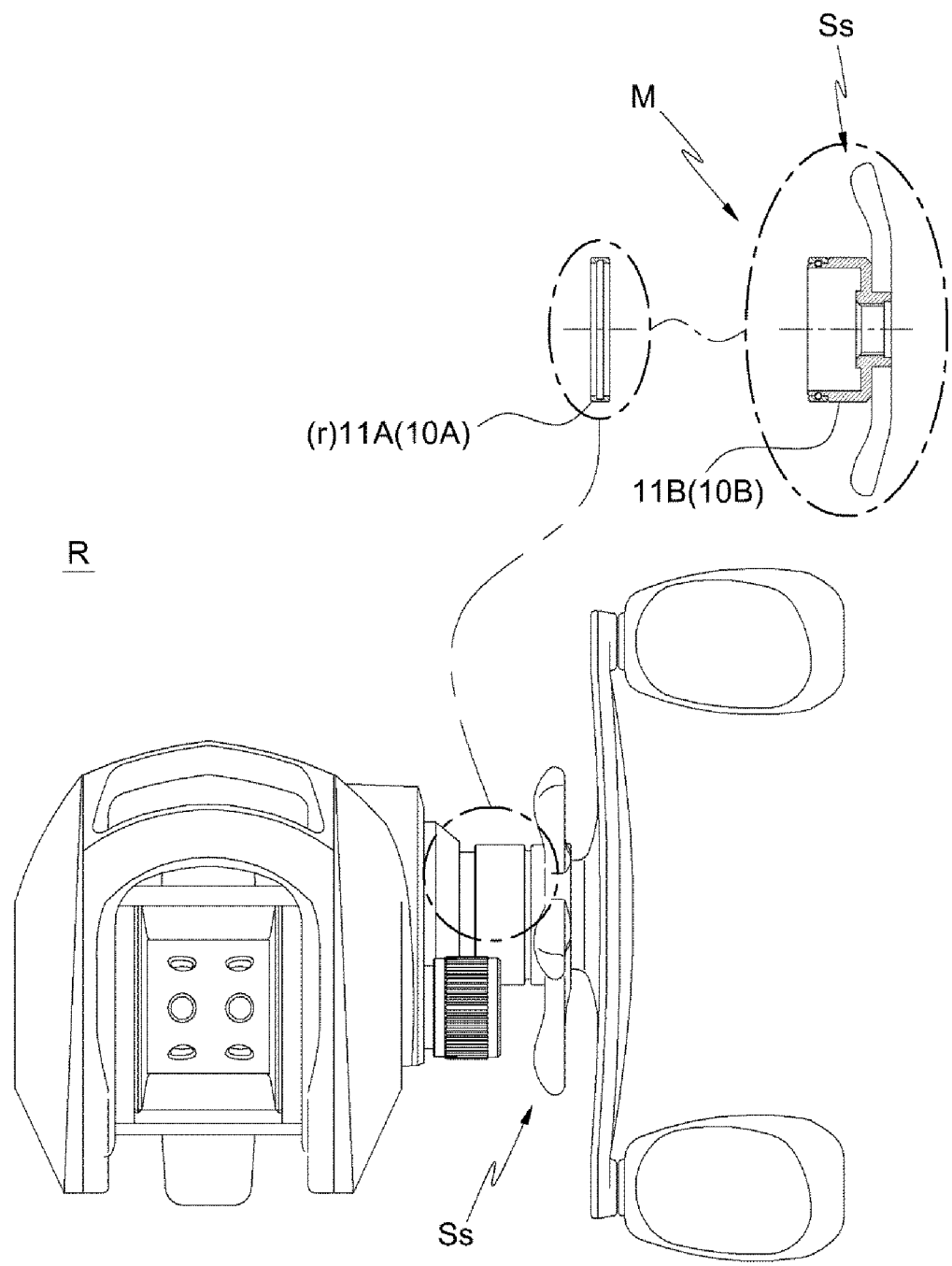
Figure 4:
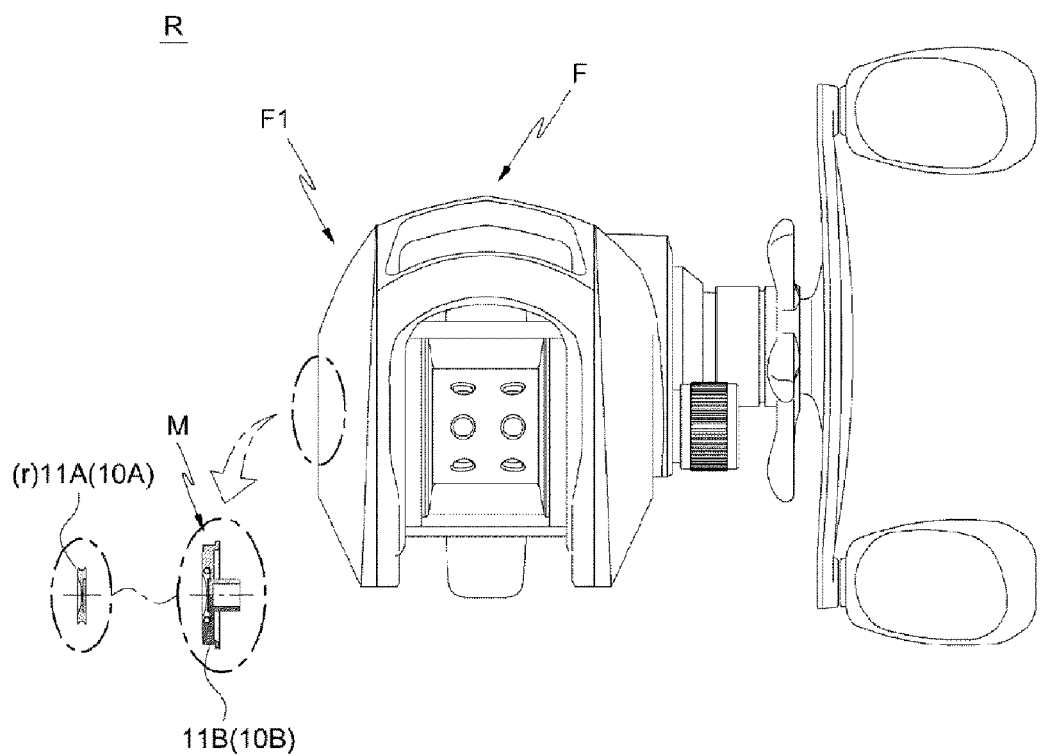
Figures 1, 6B:
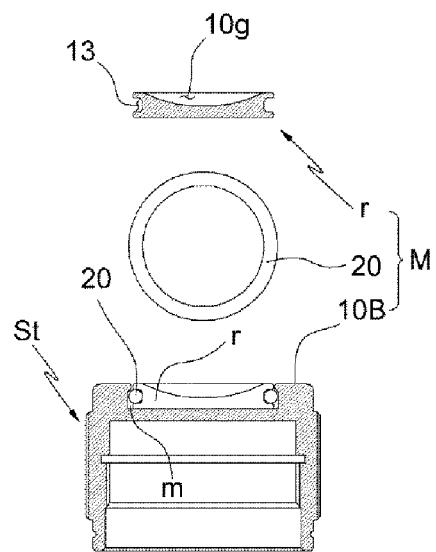
Figures 2, 6B:
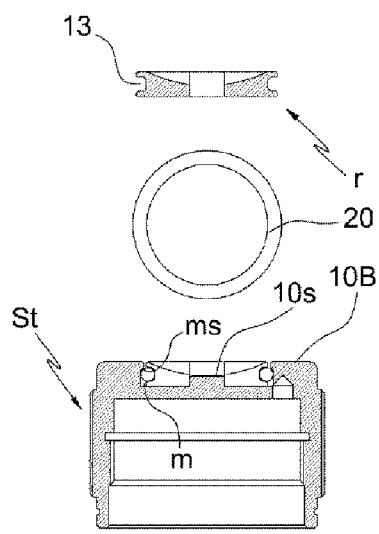
Figures 3, 6B:
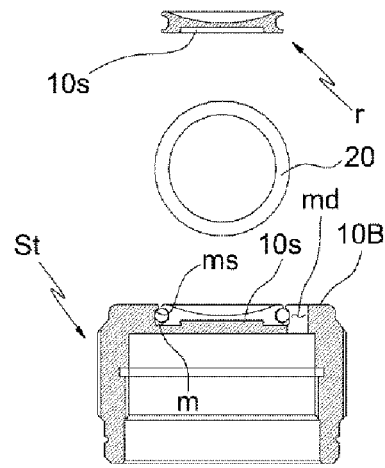

The rotary member is simply coupled to the mounting portion 'm' in FIG. 6B-1, a shaft hole 10s is formed through the rotary member 'r' in FIG. 6B-2, and a projection is formed on the tension nut with the shaft hole 10s in the rotary member in FIG. 6B-3.

In the line type markers M shown in FIGS. 6B-1, 6B-2, and 6B-3, a user can turn the rotary member 'r' for setting for line type marking by putting a nail or a coin into a slot 10g.

The mark M (arrow 11a: the indicator 11A of the scale indication section 10A) and the mark C (arrow 11b: an indicator) are arranged at 180 degrees in FIG. 6A-2, and the mark M (arrow 11a) and the mark C (arrow 11b) are arranged at 200 degrees, but in any cases, only one of the mark M and the mark C indicates numbers showing the line thickness (that is, the scale 11B of the scale section 10B).

In general, one of the sections is a scale indication section and the other one is a scale.

The indicators are marks such as arrows spaced from each other to indicate different lines and the scales are numbers spaced from each other. Further, only one of the indicators indicates a number and the other one does not indicate a number.

As shown in FIGS. 5, 10A and 10B, and 13A to 13F, when indicators showing all of M, C, and PE are used, the angles between numbers of the scale 11B and between the arrows of the indicators are selected in the same way such that only one mark indicates one number and the other marks do not indicate a number.

Figures 1, 11A:
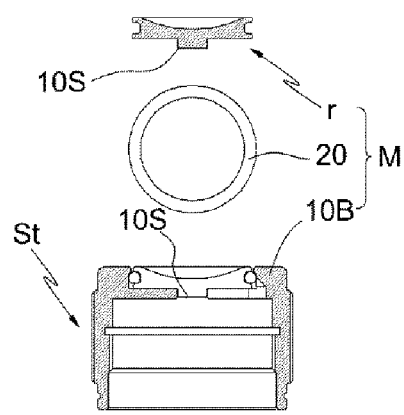
Figures 2, 11A:
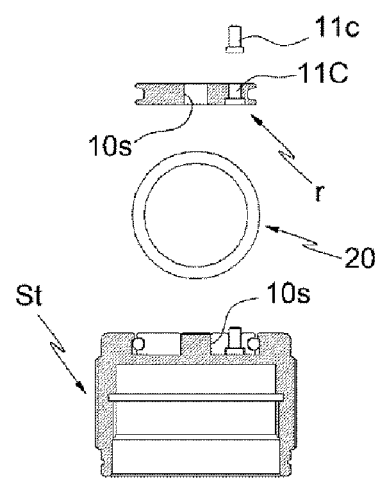
Figures 3, 11A:
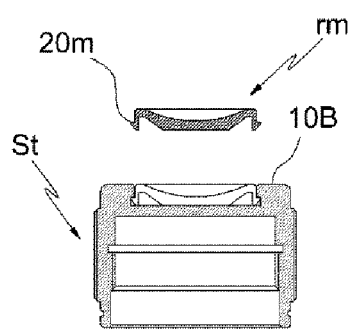

As compared with FIGS. 6B-2 and 6B-3, a protrusion 10S is formed on the rotary member for receiving a shaft for stably turning the rotary member and a slot is formed at the mounting portion 'm' of the tension nut St in FIGS. 11A-1 and 11A-2.

As compared with FIG. 11A-1, a scale indication section, particularly, indicators such as arrows that are printed or engraved are achieved by pins 11$c$ inserted in holes 11C of a rotary member in FIG. 11A-2.

A rotary member 'rm' for a line type marker shown in FIG. 11A-3 is integrated with a stopper 20$m$. That is, a wedge-shaped protrusion is formed at an end of a ring-shaped elastic protrusion around the rotary member 'rm', so when the rotary member is forcibly inserted, the protrusion is locked to a step at the edge of the mounting portion.

In the line type markers shown in FIGS. 11B-1, 11B-2, and 11B-3, as compared with FIGS. 11A-1 and 11A-2, not a disc type rotary member 'r', but a donut type rotary member rM is provided, the donut type rotary member rM is mounted on a mounting portion disposed around a tension nut St, and an elastic ring-shaped stopper 20 is disposed not in a ring-shaped groove formed outside, but in a space between a ring-shaped groove 13$m$ formed inside and a step mS formed outside the mounting portion.

Figures 1, 11B:
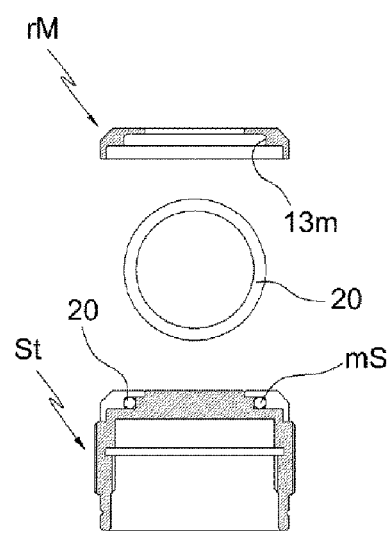
Figures 2, 11B:
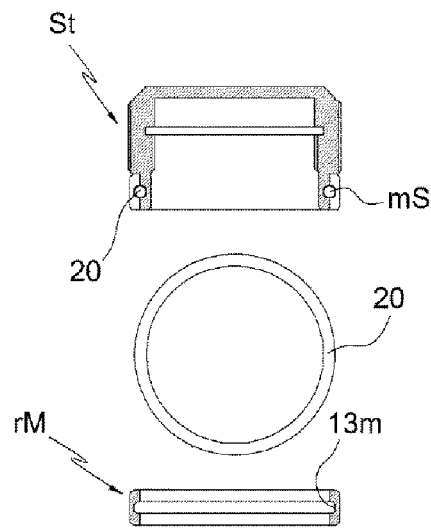
Figures 3, 11B:
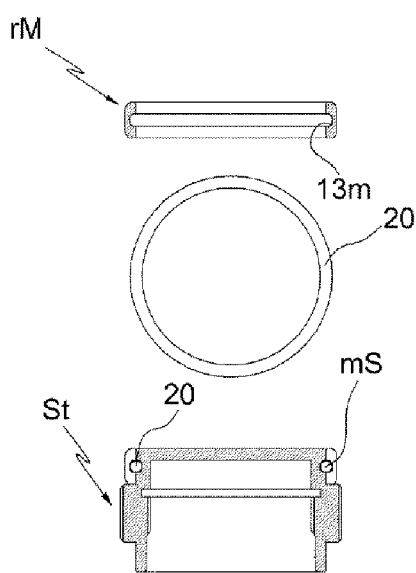

The rotary members rM are disposed relatively at the upper portion of the tension nut St in FIGS. 11B-1 and 11B-3, but the rotary member is disposed at the lower portion of the tension nut in FIG. 11B-2, so the rotary member can be prevented from unexpectedly turning when the tension nut is operated.

On the other hand, in FIGS. 12A-1 and 12B-3, a clicking member C is provided to prevent the rotary member of a line type marker from freely turning and to click when the rotary member is turned for setting for a lien type marking so that a user can more focus on setting with a sound.

Figures 1, 12A:
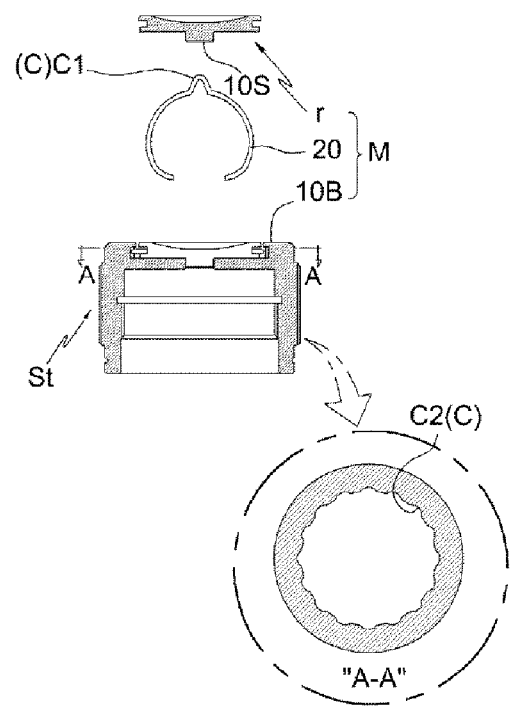
Figures 2, 12A:
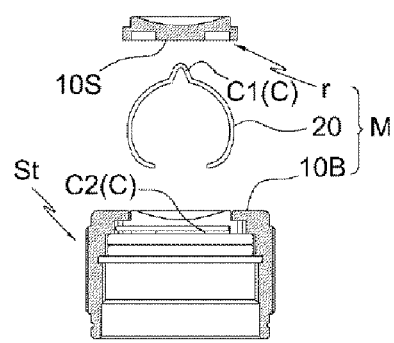
Figures 3, 12A:
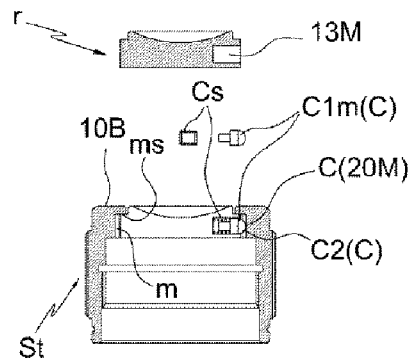

In FIGS. 12A-1 and 12A-2, the shapes and sizes of protrusions 10S of disc type rotary members are different. Further, a ring-shaped groove of the rotary member for receiving a ring-shaped spring that functions as a stopper is formed around the side in FIG. 12A-1, but a protrusion 10S is formed on the bottom of the rotary member in FIG. 12A-2.

In the markers shown in FIGS. 12A-1 and 12A-2, the ring-shaped springs that function as the stopper 20 have a protrusion C1 functioning as the clicking member C. Further, as can be seen from the top cross-sectional view taken along line A-A in the circle indicated by a dashed dotted line at the lower portion of FIG. 12A-1, a plurality of grooves C2 in which the protrusion C1 is fitted is continuously formed on the mounting portion of the tension nut St, so when the rotary member is turned, the stopper 20 is turned and the projection C1 is locked in the grooves C2, thereby generating a sound, which is the same as in FIGS. 12A-1 and 12A-2.

However, in FIG. 12A-3, the stopper 20 does not use a leaf spring, but a protrusion C1$m$ elastically supported by a coil spring Cs seated in a mounting groove 13M of the rotary member functions as a stopper and a clicking member, but the continuous grooves C2 formed around the mounting portion of the tension nut are the same as those in FIGS. 12A-1 and 12A-2.

Figures 1, 12B:
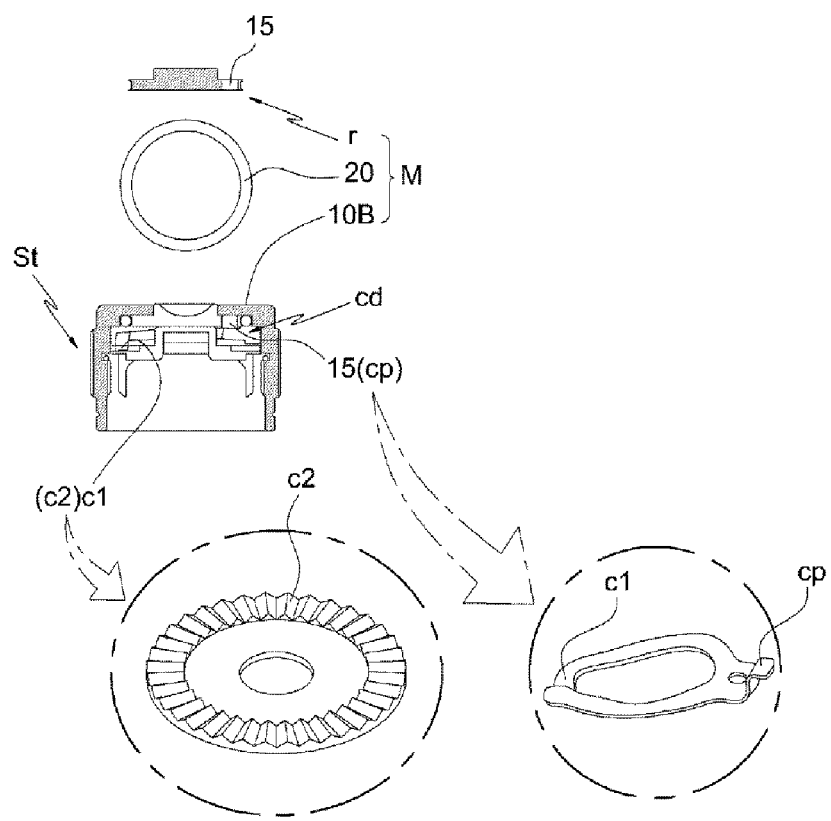
Figures 2, 12B:
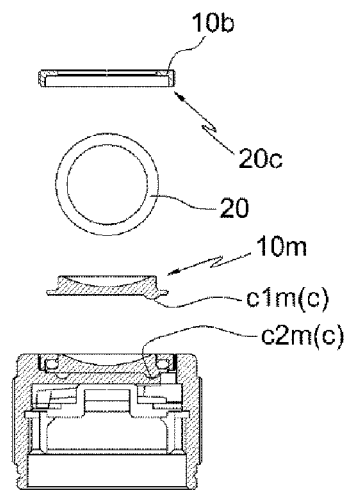
Figures 3, 12B:
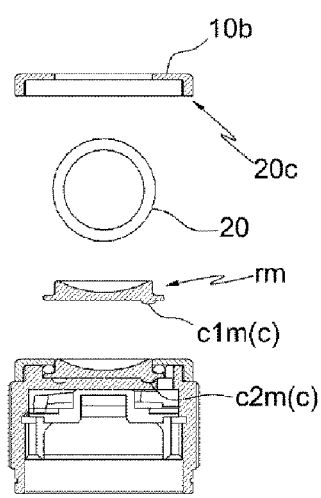

In FIG. 12B-1, as shown in the perspective view in the circle indicated by a dashed dotted line at the lower portion, a clicking member 'c' is composed of continuous grooves c2 of a crown gear in a tension nut St and a protrusion c1 of a leaf spring type click ring cd.

The click ring is twisted to function as a spring washer, so the protrusion c1 is inserted into the groove c2 by being pressed when the rotary member 'r' is assembled, and a fastening protrusion cp that is coupled to a fastening portion 15 of the rotary member for cooperation of the rotary member 'r' and the click ring cd protrudes upward.

However, in FIGS. 12B-2 and 12B-3, a protrusion c1$m$ that functions as a clicking member 'c' protrudes on the bottom of a rotary member rm and continuous grooves c2$m$ that are fitted to the protrusion c1$m$ are formed in a crown gear type on the bottom of the mounting portion of the tension nut St.

Further, in FIGS. 12B-2 and 12B-3, a stopper for preventing separation of the rotary member rm is achieved by a cap 20$c$ thread-fastened to the mounting portion of the tension nut St.

A male-threaded portion is formed on the outer side of the cap 20$c$ and a female-threaded portion is formed on the mounting portion in FIG. 12B-2, but a female-threaded portion is formed at the cap 20$c$ and a male-threaded portion is formed on the outer side of the mounting portion in FIG. 12B-3.

In FIGS. 12B-2 and 12B-3, in assembling, the rotary member rm is disposed on the mounting portion of the tension nut St, an elastic ring 20 is disposed thereon, and the cap 20$c$ having a scale 10$b$ is coupled. Accordingly, the elastic ring 20 is pressed and the protrusion c1$m$ of the clicking member 'c' is inserted into the continuous grooves c2$m$, so a sound can be generated when the rotary member rm is turned.

Next, as in FIG. 2, a mounting portion for mounting a line type marker M may be provided on a handle H, particularly, a handle knob H1. In this case, the mounting portion is formed on a cap covering a fixing bolt for fixing the handle knob H1 to the handle and a rotary member 'r' having a scale indication section 10A with indicators 11A is coupled to the ring-shaped mounting groove on the cap having a scale section 10B having a scale 11B by an elastic ring that is a stopper 20 (similar to FIG. 6B-3).

Further, as shown in FIG. 3, a line type marker M can be provided on a spool S, particularly, a star drag nut Ss by coupling a ring-shaped rotary member 'r' having a scale indication section 10A with indicators 11A to a mounting portion formed on the outer side of a star drag nut having a scale section 10B with a scale 11B, using an elastic ring that is a stopper (similar to FIG. 11B-3).

Figure 5:
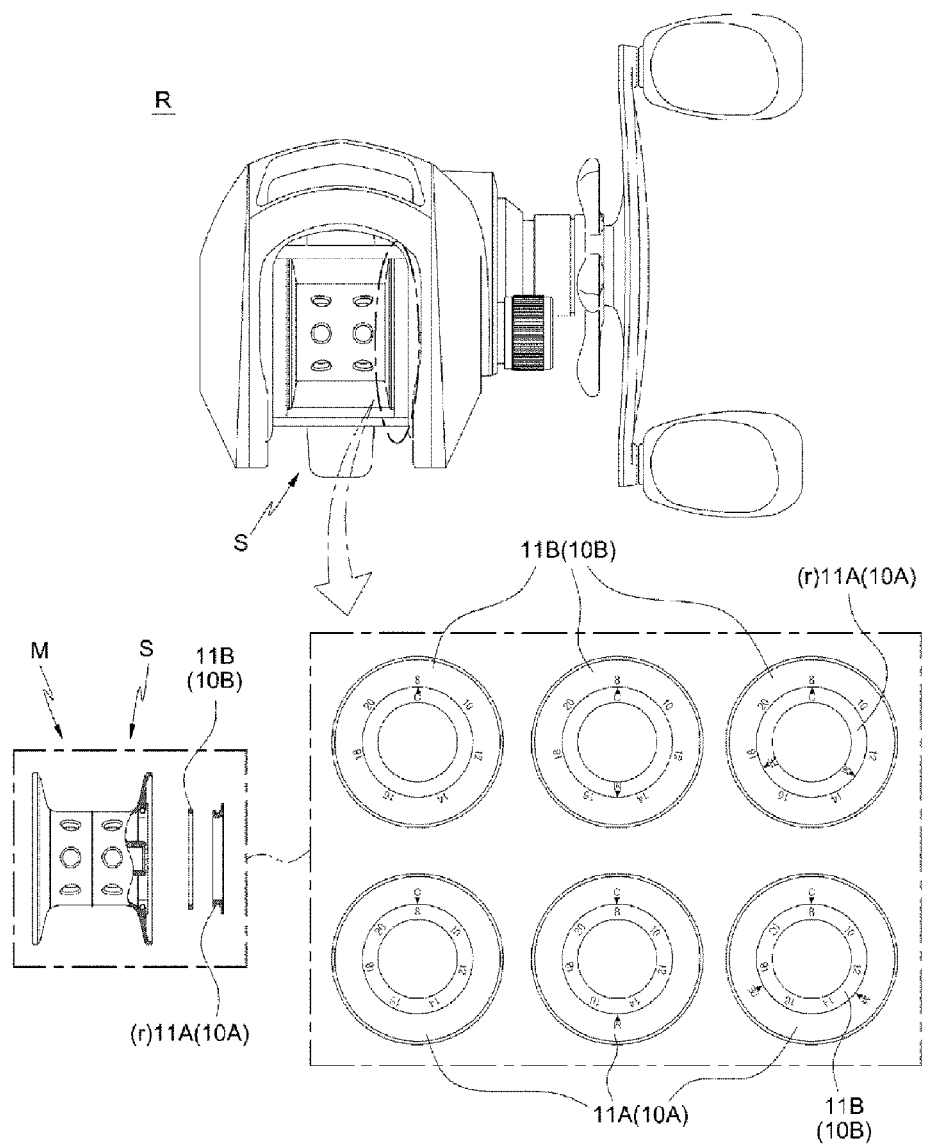

Further, as in FIG. 5, a line type marker M may be provided on a frame F, particularly, at the center of a palm side cover F1 by coupling a rotary member 'r' having a scale indication section 10A with indicators 11A to a disc-shaped mounting portion having a pin and a scale section 10B with a scale 11B, using an elastic ring that is a stopper (the coupling structure of the sections is similar to that shown in FIG. 6B-3).

In FIG. 5, a line type marker M is provided on a spool S, particularly, a spare spool by coupling a ring-shaped rotary member 'r' having a scale indication section 10A with indicators 11A to a ring-shaped mounting portion formed around a pin for coupling the spool S, which has a scale section 10B with a scale 11B, to a frame, using an elastic ring that is a stopper.

If necessary, as shown in various modifications in the block at the right middle portion in FIG. 5, a rotary member 'r' has indicators 11A (C for a braid, C and M for monofilament, C, M, and PE for polyethylene braid from the left to the right), and as shown in various modifications in the block at the right lower portion in FIG. 5, a rotary member 'r' has a scale 11B and indicators 11A around it (C, C and M, and C, M, and PE) from the left to the right). In both cases, only one of the indicators indicates a number and the others do not indicate a number in the line type mark.

Figure 7A:
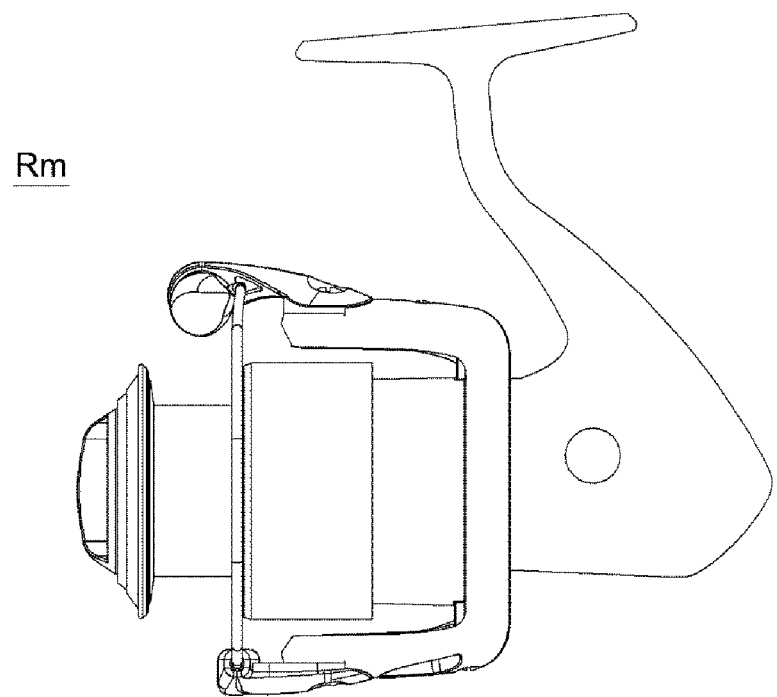
FIGS. 7A to 10B are views showing a mounting portion where a line type marker according to the present invention is disposed, in a spinning reel, different from the bait reel shown in FIGS. 1 to 6B-3, that is, showing a handle (particularly, a handle nut cap (FIGS. 7A and 8A), a handle (particularly, a handle knob) (FIG. 8B), a handle (particularly, a handle arm decoration cover (FIG. 9A), a handle (particularly, a handle arm fixing bolt cover) (FIG. 9B), a spool (FIG. 10A), and a frame (particularly, a bail wire fixing bolt) (FIG. 10B)
Figure 7B:
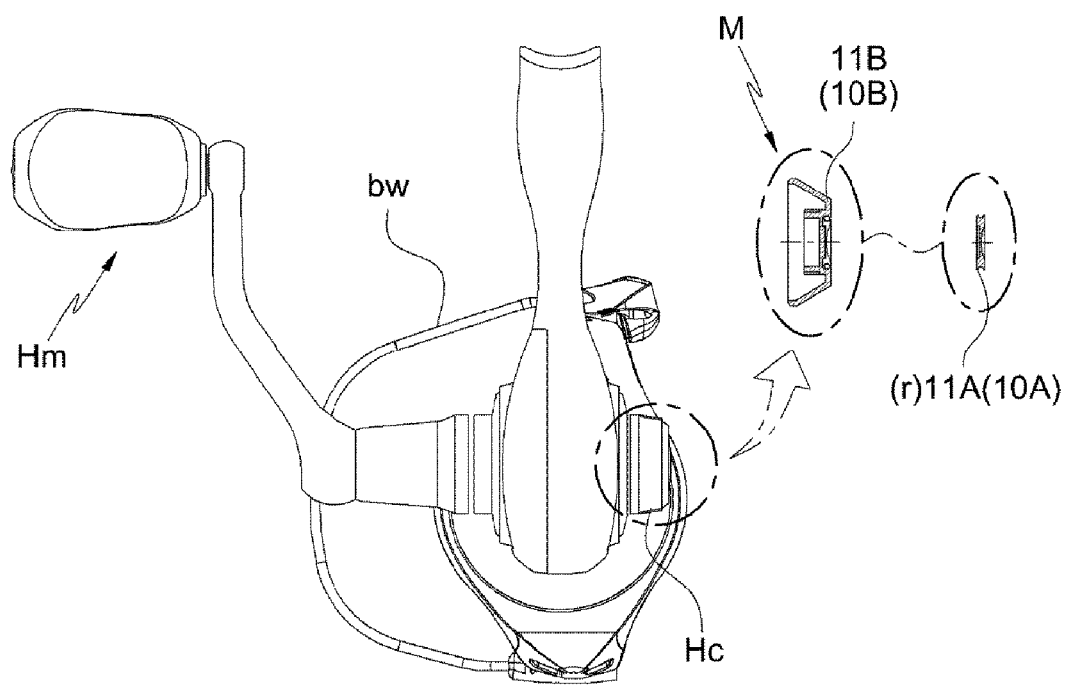

Referring to FIGS. 7A to 10B, a line type marker may be provided on a handle, particularly, a handle cap nut Hc covering a bolt for fixing the handle Hm to the frame in FIGS. 7A and 7B, in which a disc type rotary member 'r' having a scale indication section 10A with indicators 11A is coupled to a ring-shaped mounting portion of the handle cap nut Hc having a scale section 10B with a scale 11B, using an elastic ring that is a stopper.

Figure 8A:
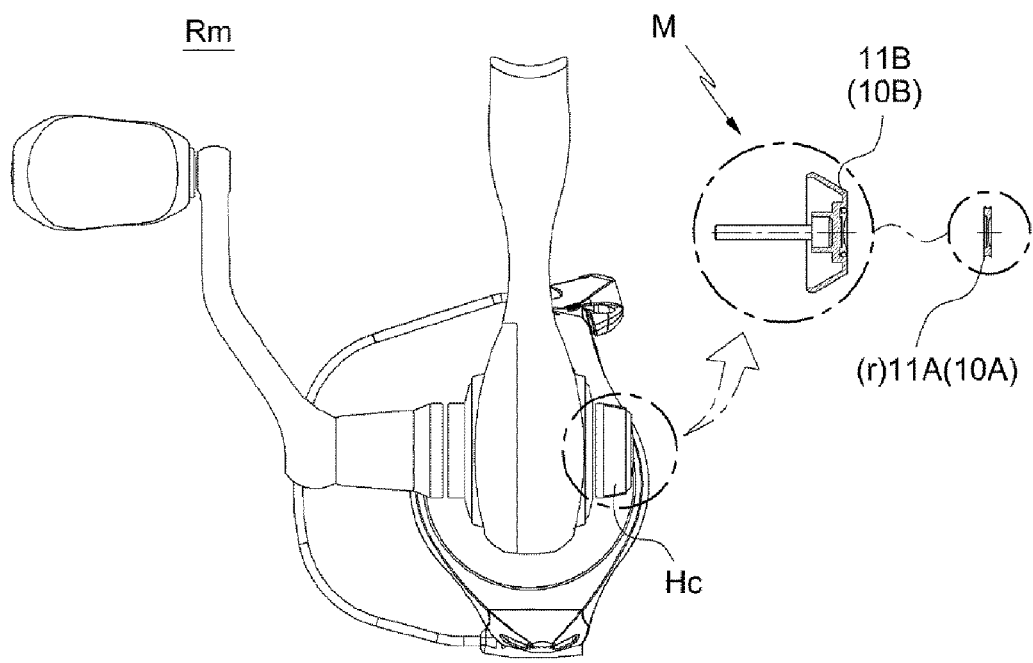

In FIG. 8A, a line type marker is provided on the handle cap nut Hc of the handle Hm, similar to the line type marker M in FIG. 7B, but is different in that the handle cap nut Hc has a fixing bolt and a pin.

Figure 8B:
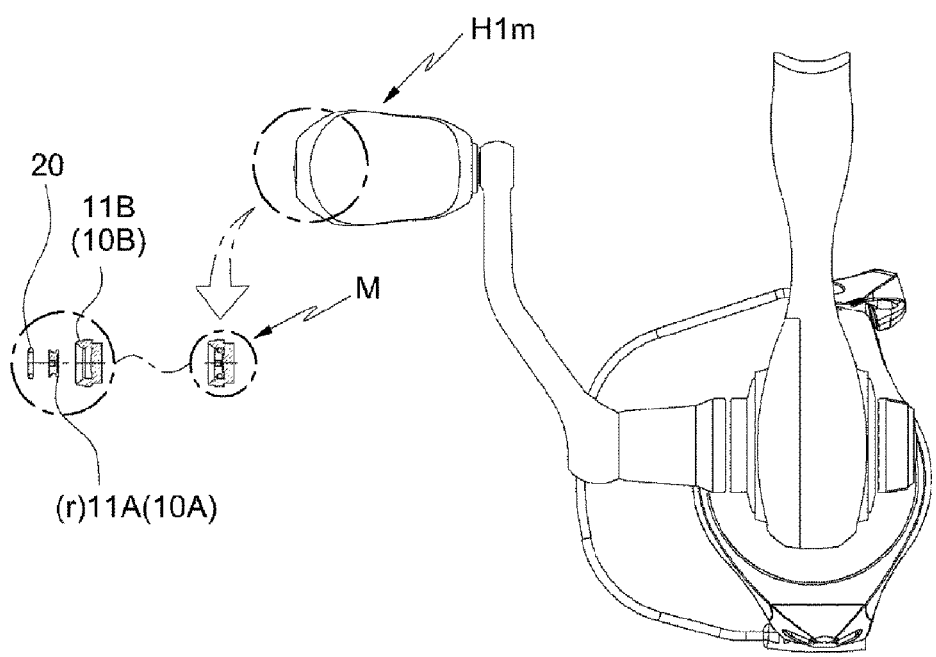

In FIG. 8B, a line type marker M is provided on the handle, particularly a handle knob Him, in which a rotary member 'r' having a scale indication section 10A with indicators 11A is coupled to a ring-shaped mounting portion of a cap having a scale section 10B with a scale 11B and covering a fixing bolt of a handle knob, using an elastic ring that is a stopper 20 (the coupling structure of the sections is similar to that shown in FIG. 6B-3).

Figure 9A:
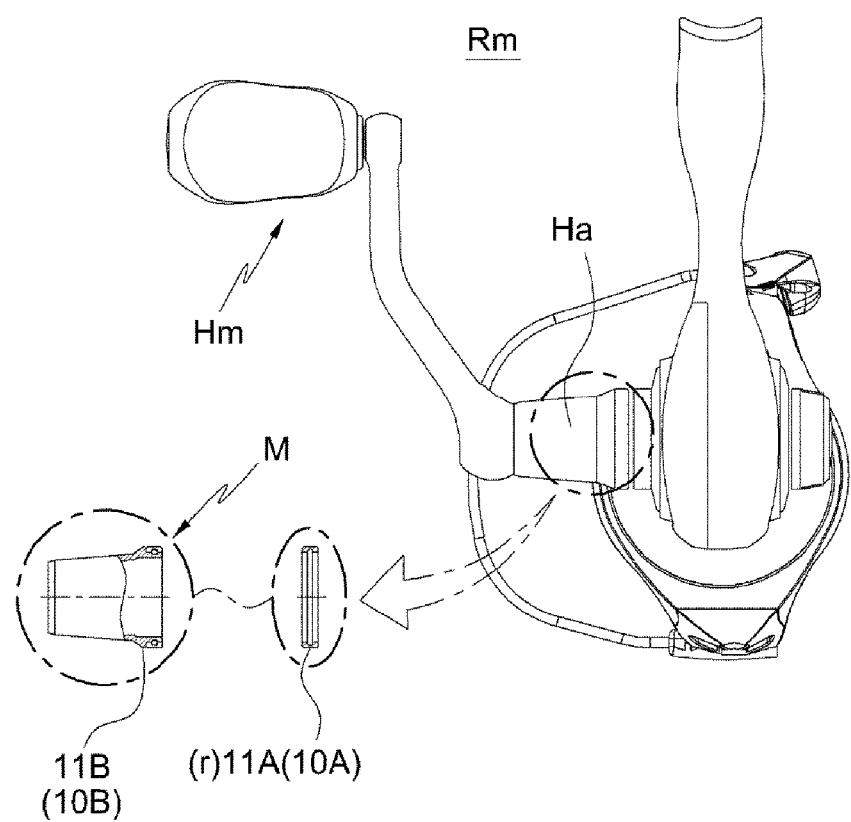

In FIG. 9A, a line type marker M is provided on the handle Hm, particularly a handle arm decoration cover Ha, in which a ring-shaped rotary member 'r' having a scale indication section 10A with indicators 11A is coupled to a mounting portion formed on the outer side of the decoration cover Ha having a scale section 10B with a scale 11B, using an elastic ring that is a stopper (the coupling structure of the sections is similar to that shown in FIG. 11B-3).

Figure 9B:
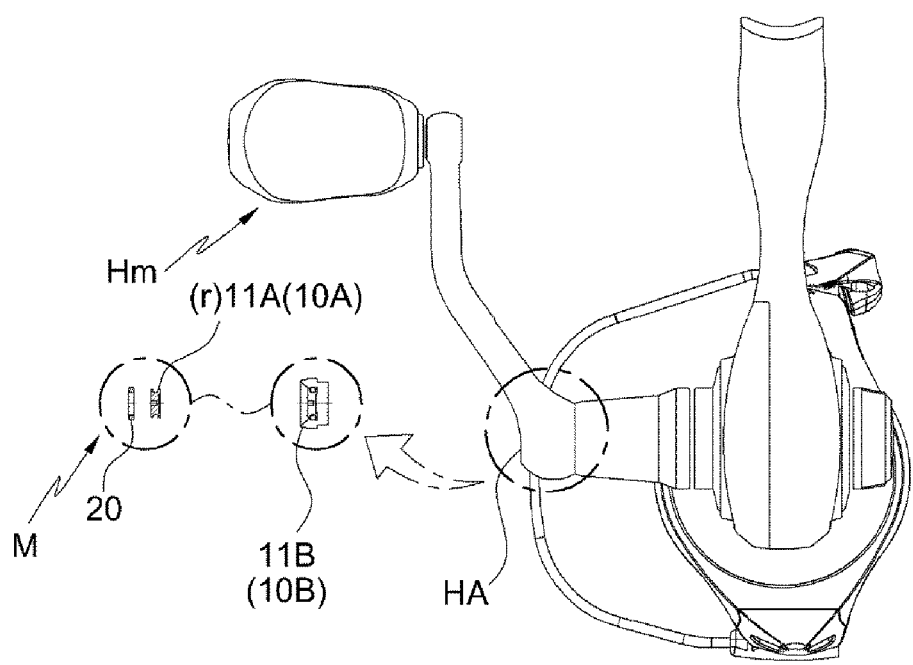

In FIG. 9B, a line type marker M is provided on the handle Hm, particularly a cover HA covering a handle arm fixing bolt (or a fixing nut), in which a disc-shaped rotary member 'r' having a scale indication section 10A with indicators 11A is coupled to a ring-shaped mounting portion of the cover HA having a scale section 10B with a scale 11B, using an elastic ring that is a stopper 20 (the coupling structure of the sections is similar to that shown in FIG. 6B-3).

The disc-shaped rotary member 'r' having a scale indication section 10A with indicators 11A is coupled to a ring-shaped mounting portion of the cover HA having a scale section 10B with a scale 11B, using an elastic ring that is the stopper 20 (the coupling structure of the sections is similar to that shown in FIG. 6B-3).

Figure 10A:
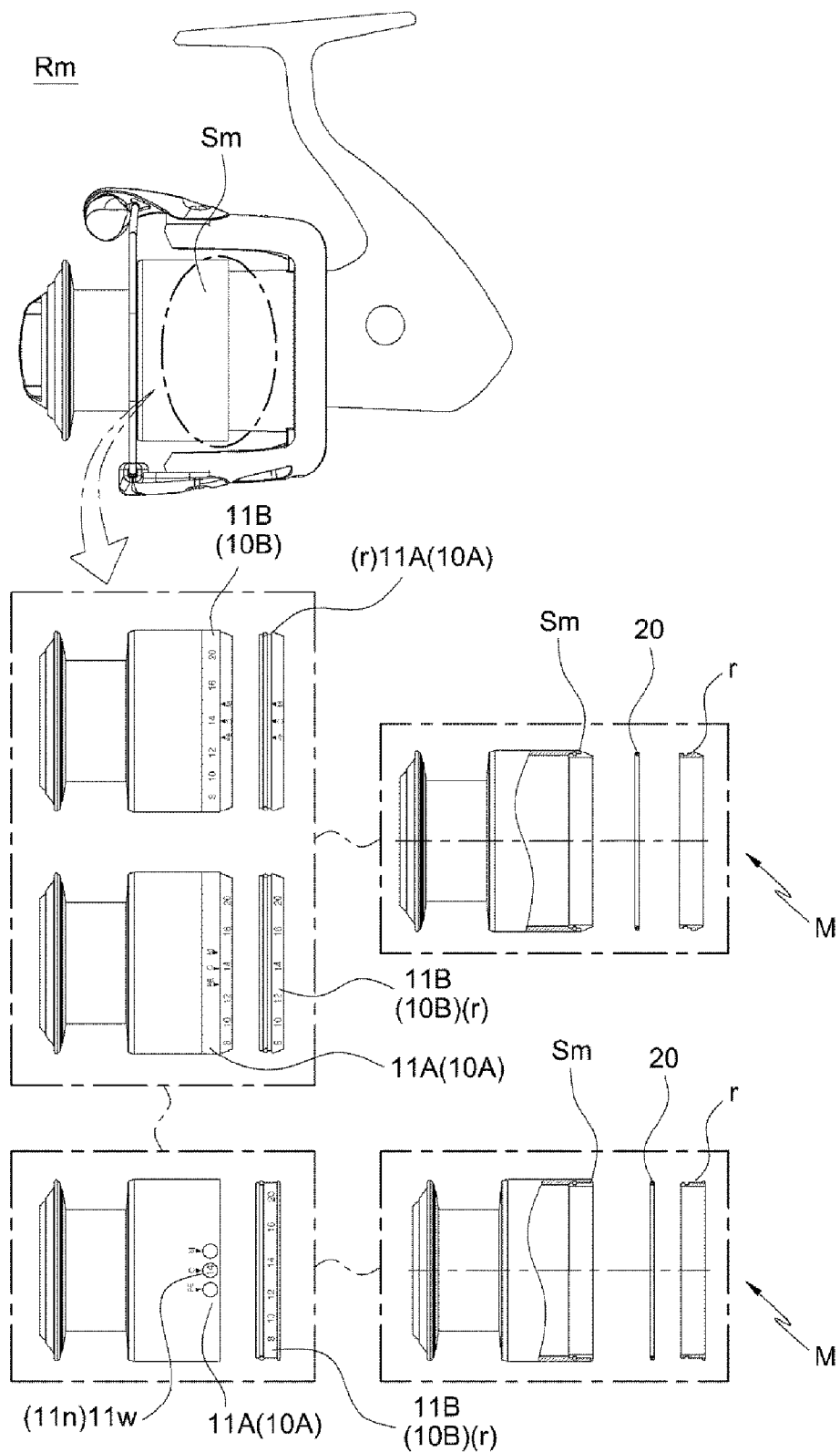

Next, in FIG. 10A, a line type marker M is provided on a spool Sm, in which a ring-shaped rotary member 'r' having a scale indication section with indicators 11A is coupled to a mounting portion formed on the outer side, particularly, a spool skirt of the spool having a scale section 10B with a scale 11B, using an elastic ring that is a stopper 20.

In FIG. 10A, two line type markers M at the lower right portions are different in that the ring-shaped rotary members 'r' have exposed-inclined sections having different lengths (the upper one is longer and steeper than the lower one).

The rotary member 'r' has indicators 11A (C for a braid, C and M for a monofilament, and C, M, and PE for a polyethylene braid from the left to the right). Three modifications are shown in the left lower block in FIG. 5, in which a rotary member 'r' has indicators 11A (C, M, and PE) at the upper one, a rotary member 'r' has a scale 11B (C, M, and PE) at the middle one, and a rotary member 'r' has a scale 11B at the lower one. The rotary member 'r' is inserted in the spool skirt deeper than the two example over it, so the numbers of the scale 11B are covered, and as the rotary member is turned, the numbers 11n of the scale 11B is shown through a window for the indicators 11A (C, M, and PE).

Figure 10B:
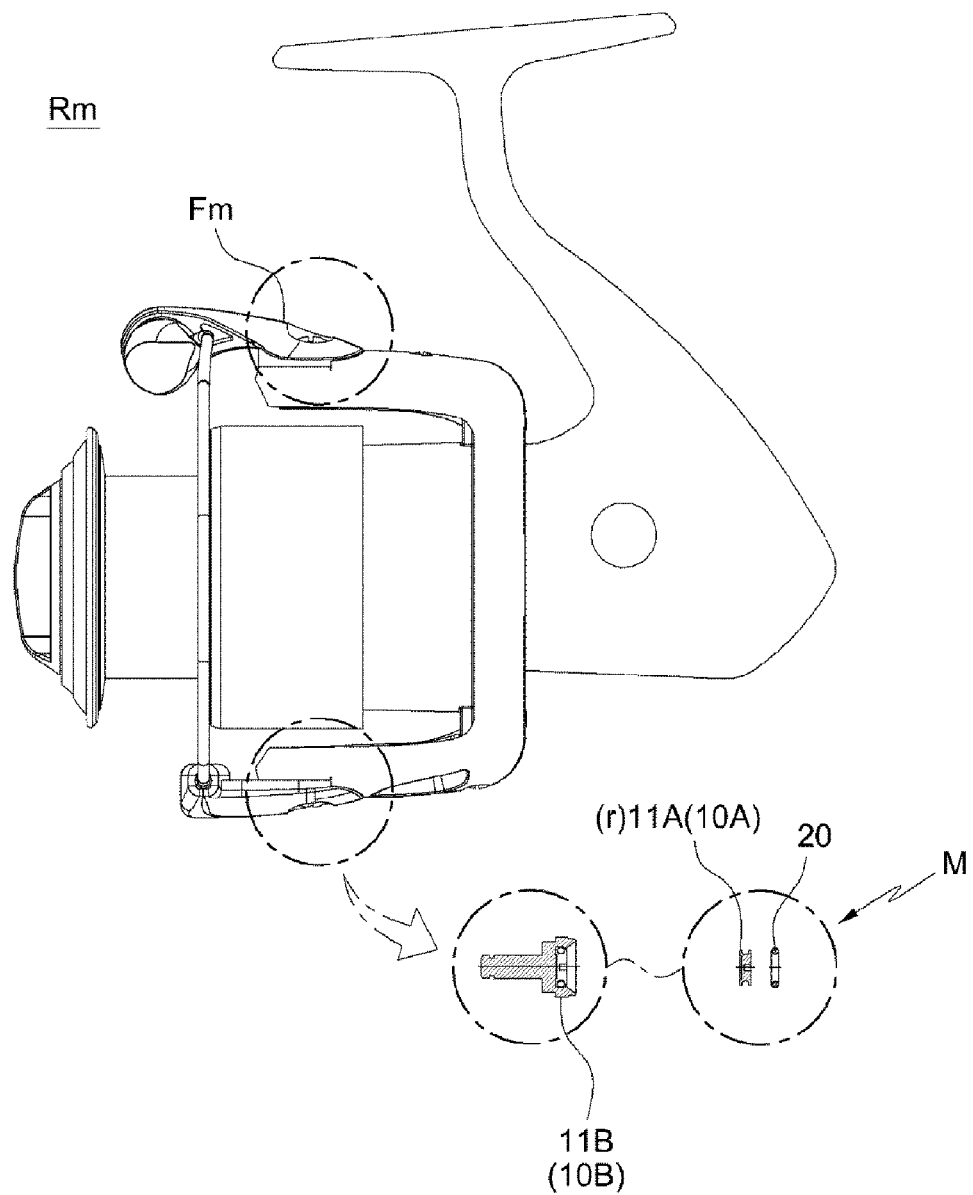

Next, In FIG. 10B, a line type marker M is provided on the frame Fm, particularly, a bail wire fixing bolt (fixing pin), in which a rotary member 'r' having a scale indication section 10A with indicators 11A is coupled to a ring-shaped mounting portion of a fixing bolt head having a scale section 10B with a scale 11B, using an elastic ring that is a stopper 20 (the coupling structure of the sections is similar to that shown in FIG. 6B-3).

In FIGS. 7A to 10B, a rotary member 'r' mounted on a ring-shaped mounting portion in a line type marker M for a spinning reel Rm is inserted relatively deep so that the body of a user or an object cannot touch it from the outside.

Line type markers M according to the present invention described above can be seen from FIGS. 13A to 16E.

First, in the block in FIGS. 13A to 13E, line type markers M have arrow indicators C (m1), C and M (m2) (arranged at 180 degrees), C and M (m3) (arranged at 170 degrees), C, M, and PE (m4) (PE is shown in a bracket with M and numbers of the scale relating to PE is also shown in brackets), and C, M, and PE (m5) on rotary members.

Figure 13A:
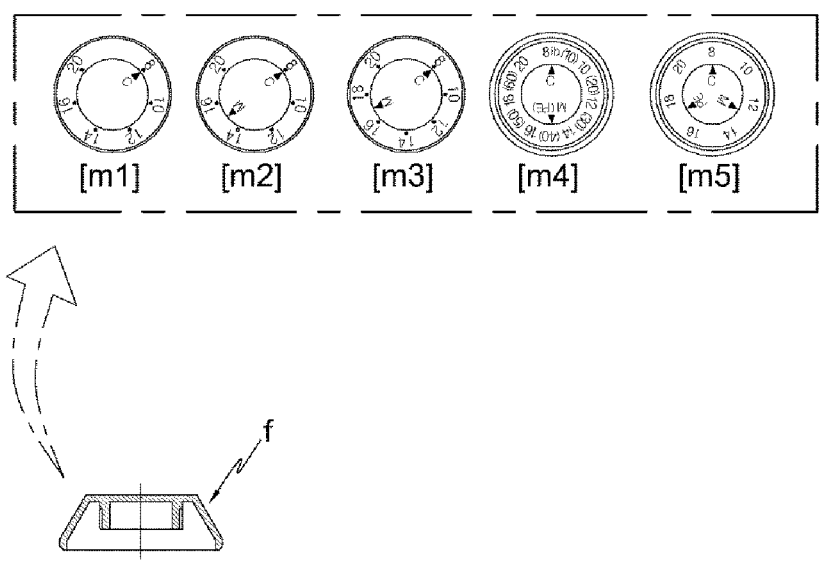
Figure 13B:
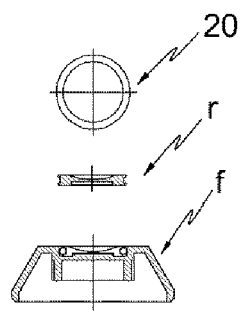
Figure 13C:
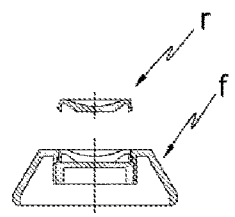
Figure 13D:
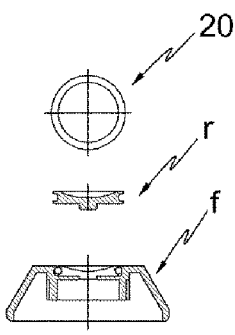
Figure 13E:
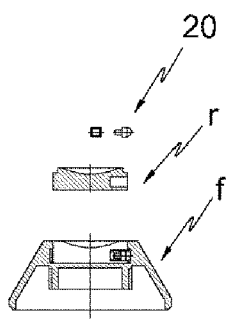
Figure 13F:
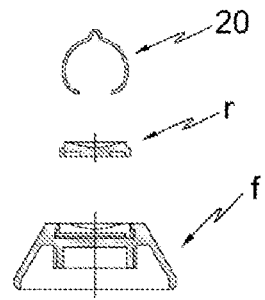

FIGS. 13A to 13F show various cap type mounting portions 'f' (commonly, ring-shaped mounting portions) and rotary members 'r'. FIG. 13A shows a model in which a cap is turned (or without a lien type marker), FIG. 13B shows a model in which a rotary member is fixed by a fixing ring 20 that is a stopper (similar to FIG. 6B-3), FIG. 13C shows a model in which a wedge-shaped protrusion is formed at an end of a ring-shaped elastic protrusion around a rotary member 'r' as a stopper (similar to FIG. 11A-3), FIG. 13D shows a model in which a protrusion is formed on a rotary body 'r' and a fixing ring 20 is used as a stopper (similar to FIG. 11A-1), FIG. 13E shows a model in which a coil spring coupled to a mounting groove of a rotary member and an elastically supported protrusion are used as a stopper and clicking is possible (similar to FIG. 12A-3), and FIG. 13F shows a model similar to FIG. 12A-2.

Next, in FIGS. 14A to 14E, various cap type mounting portions 'f' (commonly, the mounting portions are formed on the outer side of a cap) and ring-shape rotary members r1 are provided, and fixing rings 20S are used in all of the cases.

Figure 14A:
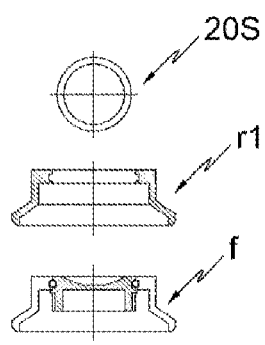
Figure 14B:
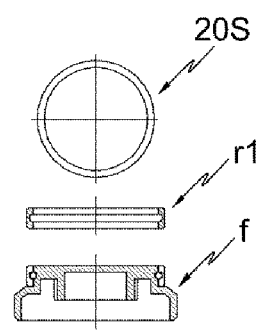
Figure 14C:
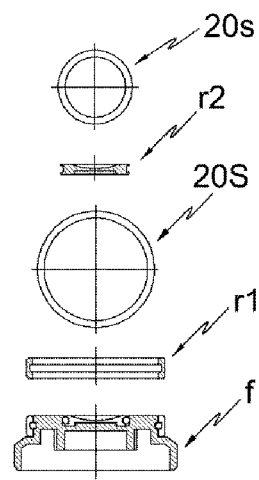
Figure 14D:
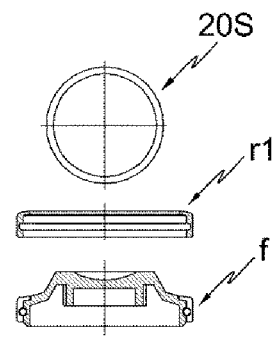

In FIG. 14C, a disc-shaped second rotary member r2 is coupled to a ring-shaped mounting groove of a cap type mounting portion 'f' of a first line type marker by a second fixing ring 20s to make a separate second line type marker so that a first rotary member and a second rotary member perform line type marking in different ways.

Figure 14E:
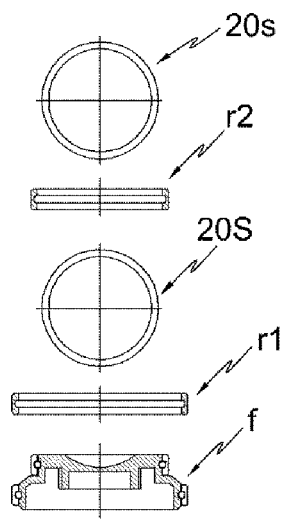
Figure 15A:
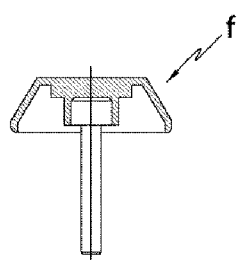
Figure 15B:
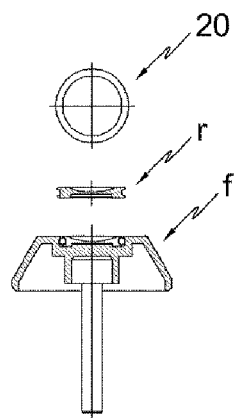
Figure 15C:
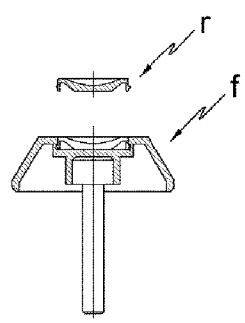
Figure 15D:
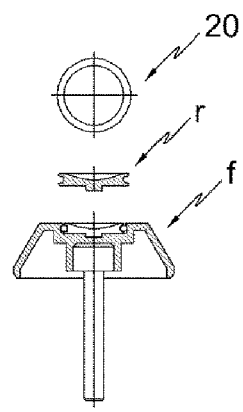
Figure 15E:
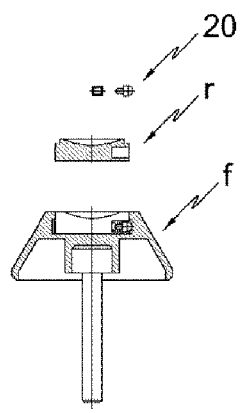
Figure 15F:
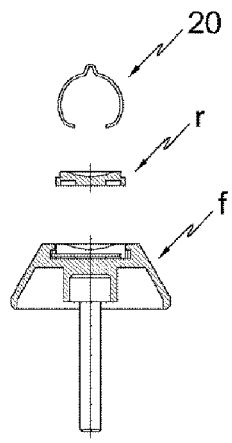
Figure 16A:
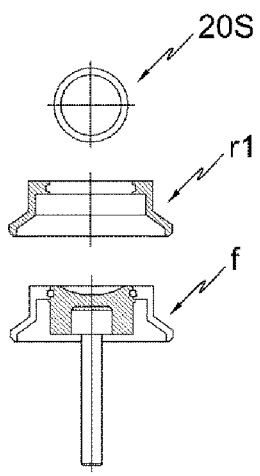
Figure 16B:
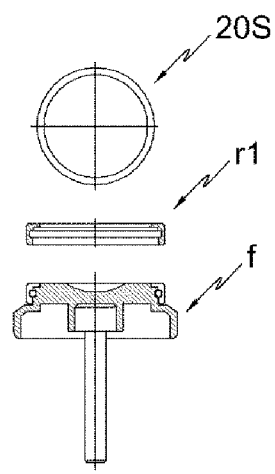
Figure 16C:
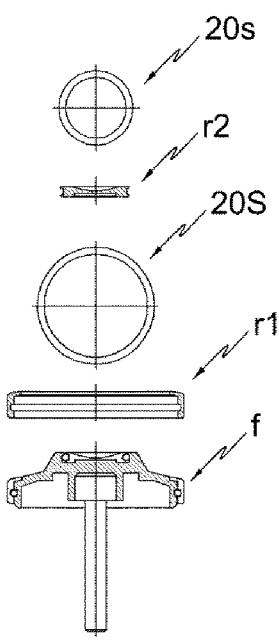
Figure 16D:
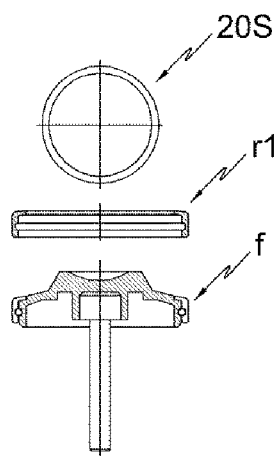
Figure 16E:
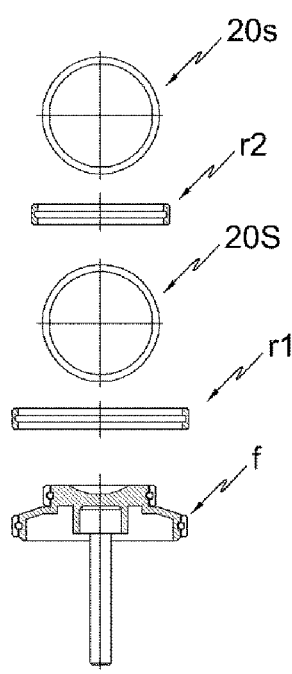

In FIG. 14E, a ring-shaped second rotary member r2 is coupled to the outer side of a cap type mounting portion 'f' of a first line type marker by a second fixing ring 20s to make a second line type marker so that a first rotary member and a second rotary member perform line type marking in different ways, which is different from FIG. 14C.

Further, examples shown in FIGS. 15A to 15F correspond to the models of FIGS. 13A to 13F, respectively, but are different in that a cap of a cap type mounting portion has a pin or a fixing bolt.

Finally, examples shown in FIGS. 16A to 16E correspond to the models of FIGS. 14A to 14E, respectively, but are also different in that a cap of a cap type mounting portion has a pin or a fixing bolt.

Common technologies relating to detailed structures and functions of a fishing reel such as a bait reel and a spinning reel, a frame, a spool, and a handle were not described above, but they can be easily estimated and implemented by those skilled in the art.

Although tension nuts which have specific shapes and structures and line type markers were described above with reference to the accompanying drawing, the present invention may be changed and modified in various ways by those skilled in the art and those changes and modifications should be construed as being included in the scope of the present invention.

What is claimed is:

1. A fishing reel having a frame, a spool fitted on the frame, and a handle fitted on a side of the frame to turn the spool, the fishing reel comprising: a line type marker including: a rotary member coupled to a mounting portion provided at at least one of the frame, the spool, and the handle; a scale indication section on the rotary member; and a scale section around the rotary member, wherein one of the scale indication section and the scale section includes indicators and the other one thereof includes scales, the indicators are a plurality of marks spaced from each other to indicate different lines, and the scales are a plurality of numbers spaced from each other, wherein only one of the indicators indicates one number and the other one of the indicators does not indicate a number in line type marking; and the line type marker includes a stopper fixing the rotary member to the mounting portion, and wherein the mounting portion has a step inside an edge thereof, an inner diameter of the step is larger than an outer diameter of the rotary member, thereby forming a gap in-between, and an elastic ring that functions as the stopper is fitted between a portion under the step of the mounting portion and a ring-shaped groove of the rotary member.

2. The fishing reel of claim 1, wherein the mounting portion is provided on a handle knob, a handle nut cap, a star drag nut, a palm side cover of the frame, the spool, or a tension nut.

3. The fishing reel of claim 1, wherein a releasing groove is formed by cutting off a portion of the step, and a shaft hole is formed through the rotary member and a projection that is fitted in the shaft hole is formed inside the mounting portion.

4. The fishing reel of claim 3, wherein the rotary member further has a clicking member.

* * * * *